United States Patent [19]

Saint Marcoux et al.

[11] 4,315,299

[45] Feb. 9, 1982

[54] POWER CAPACITOR WITH HIGH HEAT DISSIPATION

[75] Inventors: Roland Saint Marcoux; Léon Fink, both of Paris, France

[73] Assignees: L.C.C.-C.I.C.E, Compagnie Europeenne de Composants Electroniques, Bagnolet; Thomson-CSF, Paris, both of France

[21] Appl. No.: 113,503

[22] Filed: Jan. 21, 1980

[30] Foreign Application Priority Data

Jan. 19, 1979 [FR] France .................. 79 01339

[51] Int. Cl.³ .............................................. H01G 1/08
[52] U.S. Cl. ...................................... 361/274; 361/321
[58] Field of Search ............................. 361/274, 321

[56] References Cited

U.S. PATENT DOCUMENTS 1,934,475 11/1933 Bailey ........................ 361/274 X

FOREIGN PATENT DOCUMENTS 2207283 10/1972 Fed. Rep. of Germany ...... 361/274
1032274 2/1951 France .
363129 11/1973 U.S.S.R. ........................... 361/274

Primary Examiner—Elliot A. Goldberg
Attorney, Agent, or Firm—Oblon, Fisher, Spivak, McClelland & Maier

[57] ABSTRACT

The application relates to a high power tubular ceramic capacitors cooled by an auxiliary fluid. To increase the electrical power dissipated by these capacitors a better thermal equilibrium is obtained by means of a novel turbulent, laminar, cooling water circuit between the capacitor body and a central tube having a large relative diameter, said device cooperating with a connector which distributes the dissipated heat over the capacitor body.

11 Claims, 5 Drawing Figures

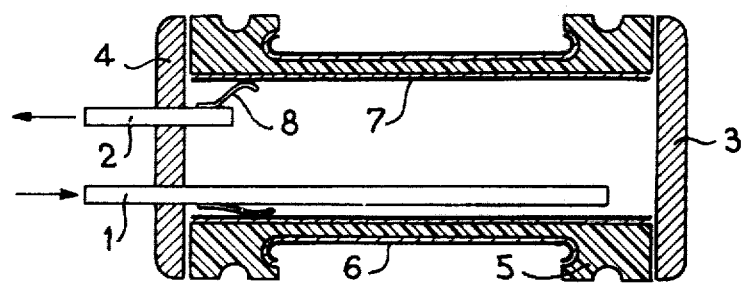
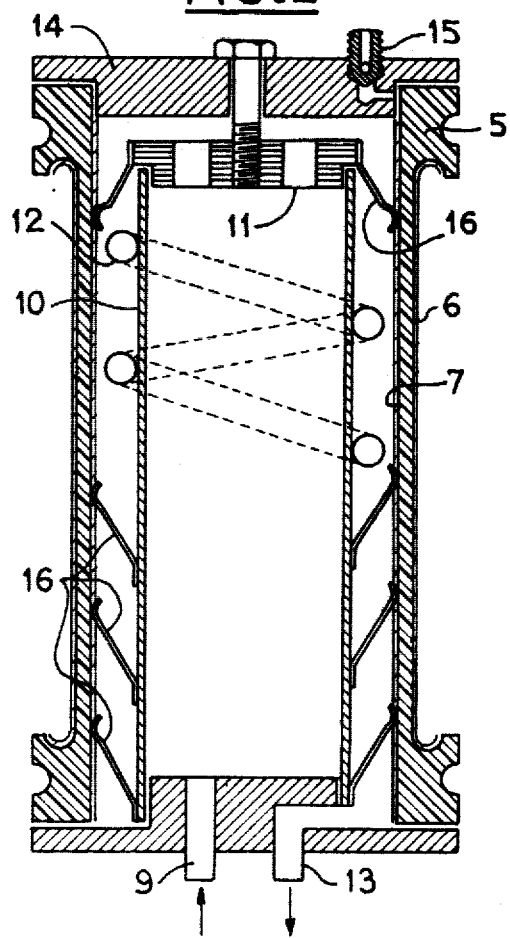

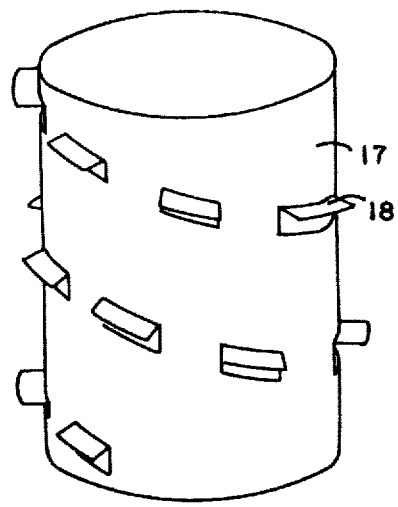
FIG_3
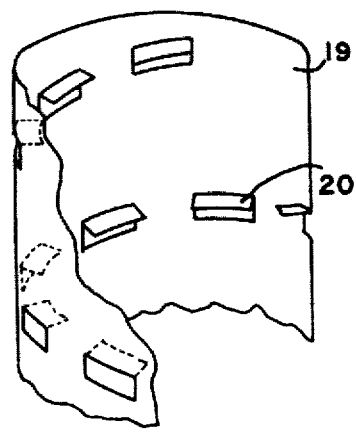
FIG_4

4,315,299

POWER CAPACITOR WITH HIGH HEAT DISSIPATION

BACKGROUND OF THE INVENTION

The present invention relates to high reactive power, tubular ceramic capacitors. It relates more specifically to the cooling system and the connector whose internal contacts cooperate to provide a better distribution of the heat given off by the capacitor in order to eliminate it more regularly, which leads to a factor between 2 and 10 of the admissible reactive power and the voltage applied.

High power capacitors are generally used without any special protection, an external coating of enamel or varnish being sufficient to ensure completely satisfactory operation under normal conditions of use. The removal of the heat produced during energizing can be effected by natural convection. The admissible reactive power is limited to a few hundred reactive kilovolt-amperes.

The reactive power limitation on the use of a ceramic capacitor is due to the heating caused by the losses in the dielectric and, at higher frequencies above 1 megahertz, to losses by the Joule effect in the connections and foils. It is therefore important to limit the heating of the complete capacitor to a temperature on this side of the thermal casing threshold, i.e. 90° C.

To keep the dielectric temperature to a value compatible with its possibilities it is conventional procedure to remove the heat by circulating water within the capacitor.

BRIEF SUMMARY OF THE INVENTION

The capacitor according to the invention has been designed to optimize its cooling by means of a connector with multiple contacts whose function, by multiplying the contact points, is to divide the current density at each contact point and consequently to distribute the sources of heating, said first connector cooperating with a turbulent flow system for the colling fluid with a view to preventing any rest zones in which there is no fluid circulation.

More specifically the invention relates to a power capacitor with high heat dissipation constituted by a hollow dielectric body supporting an external foil and an internal foil into which the cooling fluid is introduced by a sleeve whose diameter is close to that of the cooled foil, wherein for the purpose of increasing the reactive power allowed by the capacitor static means distribute the cooling fluid circulation between the cooled foil and the sleeve in such a way that the fluid layers are mixed.

BRIEF DESCRIPTION OF THE DRAWINGS

The invention is described in greater detail hereinafter relative to non-limitative embodiments and with reference to the attached drawings, wherein show:

FIG. 1 a power capacitor cooled by an auxiliary fluid according to the prior art.

FIG. 2 a power capacitor cooled by an auxiliary fluid according to the invention.

FIG. 3 means for mixing or stirring the fluid layers according to the invention.

FIG. 4 another mixing or stirring means according to the invention.

DETAILED DESCRIPTION OF THE PREFERRED EMBODIMENTS

Figure 5:
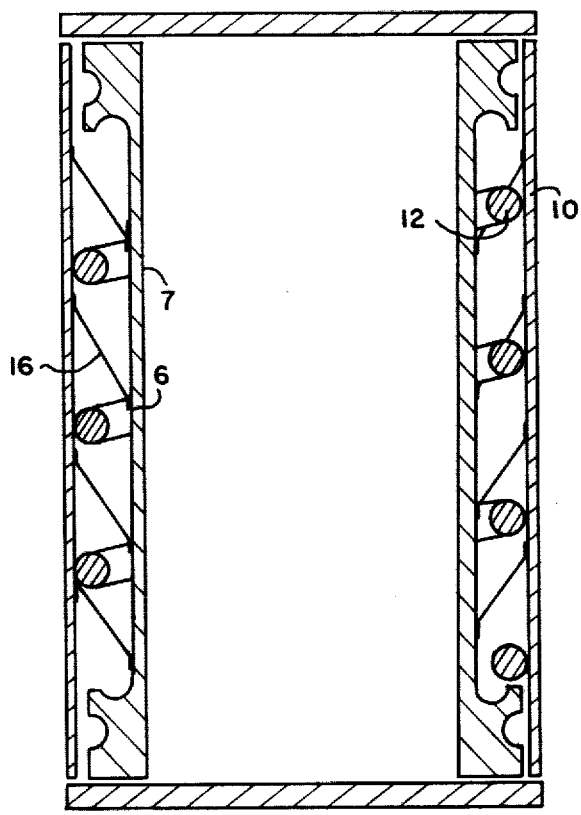
FIG. 5 illustrates an embodiment in which the sleeve is outside the body.

As water is the most commonly used cooling fluid it will be used as an example hereinafter, although this does imply that other cooling fluids and/or electrical insulants cannot be completely satisfactorily used within the scope of the invention.

FIG. 1 shows a high power capacitor with a tubular dielectric body according to the prior art. FIG. 1 only contains what is absolutely necessary to permit understanding of the explanations, except, for example, the fixing, closing and sealing means, the external insulation, etc. This also applied to FIG. 2.

The water is circulated by two pipes 1 and 2 of unequal lengths, one of them (1) penetrating up to the face opposite to the intake end plate, whilst the other (2) only projects just beyond said end plate. The liquid circulating between the inner walls of the capacitor removes the heat in a very unequal manner. Thus, the ceramic tube 5 which carries the electrodes or foils in the form of an external metal coating 6 and an internal metal coating 7 has a much larger diameter than the water pipes 1,2. Under these conditions the internal cavity of the capacitor constitutes an area where the flow of water and therefore the cooling action is poorly defined. If the water flow rate is low the flow can be laminar with, however, stationary areas close to the end plate 4.

Moreover, tube 5 is cold on the side of end plate 3 and hot on the side of end plate 4. A rapid flow can be turbulent, but this is not advantageous for industrial purposes and the course of the water does not guarantee that heat elimination will take place in a regular manner on the inner ceramic surface, due to the preferred paths taken.

Furthermore, as the end plates 3 and 4 are very generally electrically insulating, to prevent high voltage arcs the internal connector is provided by means of metal water pipes connected to the internal foil of the capacitor by a ring of flexible plates 8. A second identical ring is sometimes installed in an identical manner at the other end of tube 5, but there is still a high current density and consequently considerable heating level with each contact ring, because there is only a small number of contact points.

The capacitor according to the invention obviates these disadvantages by a better distribution of the heat supplied and removed, which improves the service life and reliability of the capacitor.

FIG. 2 shows a power capacitor provided with means according to the invention. As described in the prior art the capacitor comprises a cylindrical body 5 covered with an external foil 6 and an internal foil 7.

The cooling water is introduced by a connection 9 located at the end of the capacitor body and directed towards the other end of the capacitor body by means of a sleeve 10, whose diameter is large compared with that of the body 5. The cooling fluid volume contained within the sleeve 10 serves as a thermal ballast and by preheating damps the thermal shock to which the capacitor body would be exposed by introducing cold water at one end, said water being discharged hot at the other end.

The cooling water exits the sleeve 10 via orifices made in the fixing and centering member 11 and is laminar between sleeve 10 and the internal foil 7 of the capacitor. The fluid leaves the capacitor through a connection 13 located at the same end of the capacitor body as the intake connection 9.

The layers of cooling fluid in contact with the internal foil 7 are renewed all along the capacitor due to the movement imparted to them as from their formation by appropriate mechanical means. The function of these means is to prevent the establishment of a stable laminar system and to reate exchanges between the layers in contact with the internal foil 7 and the layers in contact with the sleeve 10.

This exchange is obtained by a circulation of the cooling fluid layers in directions which are not parallel to one another. Thus, in the embodiment of FIG. 2, a helical ramp 12 is fixed to the sleeve 10 and its external diameter is slightly smaller than the diameter of foil 7.

The acceleration of the fluid due to the helical circulation considerably increases the Reynolds number and therefore the heat exchange. In addition, the combination of the existance of a helical channel and a space between the spiral and the internal electrode ensures for variable viscosities and in particular for that of water at the operating temperatures used a considerable supplementary improvement to the heat transfer between the fluid and the internal foil.

The capacitor according to the invention is shown in FIG. 2 in the case of internal cooling, although this in no way limits the invention. Thus, the tubular capacitor according to the invention also functions completely satisfactorily if the cooling is supplied by an external sleeve surrounding the capacitor, the cooling fluid circulating between the sleeve and the external electrode of the capacitor in this case removing the heat taken from the external electrode. The static means for distributing the circulation of fluid are then positioned between the external electrode and the sleeve and the mixing or stirring of the fluid comply with the same criteria.

In the case of external cooling the central tubular cavity of the capacitor remains sealed at its ends by two end plates to prevent the condensation of atmospheric humidity within the cavity.

The electrical connectors are then preferably in the axis of the capacitor. On the external electrode the contacts are provided by clips with flexible bands, which will be described hereinafter, with connection to an end plate which obviates traversing the outer cooling sleeve. On the internal electrode the output connection of the contacts can advantageously be rigid for forming the mechanical supporting and fixing means of the capacitor. The connections of the two foils leave by the opposite end plates of the capacitor.

FIG. 3 shows another means for creating an annular mixing or stirring channel, in the general case of the internal cooling of the capacitor. According to this embodiment the sleeve 10 is externally jacketed by the tube 17 shown in FIG. 3, said tube having externally positioned ribs 18 oriented in accordance with a helical ramp for creating a single annular channel or oriented so as to create a plurality of intersecting annular channels.

FIG. 4 shows another embodiment in the form of a broken away view of a comparable sleeve 19 to that described hereinbefore, but arranged against the inner foil 7 and in close contact therewith. The fins 20 are turned towards the inside of the capacitor and the annular channel is located against the foil, whilst the longitudinally circulating layers are located against the sleeve 10. In this case a heat exchange function between the foil and the cooling fluid is added to the liquid mixing function of the fins.

In more general terms the circulation of fluid can be disturbed by irregularities, such as bosses or wedges, or by a toroidally wound metal or plastic grid placed between the internal foil and the sleeve. The constant between the different means used is such that by a more effective mixing of the cooling fluid a better heat transfer is obtained between layers close to the electrode, the heat source and remote layers. Moreover, said mixing drives out the small air bubbles fixed to the wall and which can create a heat shield.

Furthermore at the time of filling the capacitor with the fluid an air bubble forms which is fixed in the upper part of the capacitor which, by a poor heat exchange, may cause a very localized heating leading to the destruction of the capacitor. This disadvantage is obviated by fixing a drain cock 15 to the end plate 14 of the upper part of the capacitor and during the introduction of water into the installations said cock discharges air which could be located there.

The described device is designed so as to permit a better distribution of the cooling action of the capacitor. It is completed by a connector with a view to bringing about a better distribution of the heating effect of the capacitor.

The power capacitors of the present type dissipate power levels between a few hundred and a few thousand reactive kilovolt-amperes. An increase in the number of connectors at a plurality of points positioned over the entire surface area of the foils and no longer only in the vicinity of the two ends as is frequently the case leads to the reduction in the current density at each contact point and consequently to the better distribution of the hot points, i.e. to the limitation of the heating of foils 6 and 7.

The large number of contact points is ensured by a large number of clips 16 formed from known flexible multicontact strips. These clips are fixed along sleeve 10, which thus constitutes the internal connection of the capacitor at a plurality of levels distributed outside the zone where the helical ramp creates a turbulent movement of the water.

An improvement to the invention comprises using the same method for covering the electrodes of the capacitor and for covering the clips. The generally used metal is copper-beryllium, which is well known for its elasticity. As silver is a good thermal and electrical conductor it combines the advantages of cooperating in distributing the heat and in opposing electrochemical corrosion, so that it constitutes a good, but non-limitative example.

Comparable multicontact clips between the connection and the external foil improve the thermal equilibrium of the capacitor, although they are not shown in the drawing so as to facilitate the understanding thereof.

Moreover, in order to improve the electrical and thermal conductivities the foils are constituted by a high electrical conductivity metal coating, whose silver content is between 70 and 90%. The metal coating rests on an undercoating permitting a faultless connection between the dielectric material and the electrodes. The electrical connections are made from copper with a very high electrical conductivity covered with an adequate silver coating.

As a non-limitative example a tubular capacitor as described hereinbefore with a ceramic dielectric, of 4000 picofarads traversed by water at a rate of 3 liter/minute allows a power of 3500 reactive kilovaltamperes without damage and with maximum safety.

FIG. 5 is a broken away view of another embodiment in which the sleeve 10 is outside the body 5 and cools the outer armature 6.

What is claimed is:

1. A power condenser with high thermal dissipation, comprising:

a hollow dielectric body;

an external armature supported by the outer surface of said body;

an internal armature supported by the inner surface of said body;

a sleeve coaxial with said hollow dielectric body and having a diameter close to the diameter of said body, whereby a space is formed therebetween;

connecting means communicating the side of said sleeve opposite said space with said space; and at least one static device arranged along a helicoidal pattern in said space, whereby a cooling liquid can flow longitudinally past said opposite side of said sleeve to said connecting means and into said space, whereby said cooling liquid can flow through said space in a helicoidal flow pattern to thereby become stirred and increase the heat transfer between said cooling liquid and said condenser.

2. The condenser of claim 1 wherein said sleeve and said inner surface of said body are cylindrical, and wherein said sleeve includes inlet means opposite said connecting means and extends into the hollow of said body, whereby said cooling liquid can flow through said sleeve in a first direction from said inlet means towards said connecting means, and then in a second direction through said space, whereby said inner surface is cooled.

3. The condenser of claim 1 wherein said sleeve is located outside said body and surrounds said external armature, whereby said external armature is cooled.

4. The condenser of claim 1 wherein said at least one static device comprises a helicoidal ramp attached to said sleeve and wherein said sleeve has an outer diameter less than the diameter of said inner surface.

5. The condenser of claim 1 wherein said at least one static device comprises a cylinder adjacent said sleeve and including an exterior helicoidal pattern of fins extending into said space and adapted to induce the stirring of said cooling liquid.

6. The condenser of claim 1 wherein said at least one static device comprises a cylinder adjacent said inner surface and including an interior helicoidal pattern of fins extending into said space and adapted to induce the stirring of said liquid coolant.

7. The condenser of claim 1, wherein said at least one static device comprises a grating in said space.

8. The condenser of claims 1 or 2 or 3 or 4 or 5 wherein the electrical contact points for said internal armature are provided by a plurality of rings covered with the material of which said armature is composed.

9. The condenser of claims 1 or 2 or 3 or 4 or 5 wherein said cooling liquid within said sleeve comprises a thermal ballast for said condenser body.

10. The condenser of claim 8 wherein said sleeve is electrically connected to said internal armature via said rings.

11. The condenser of claim 1 including at least one sealing flange for closing off at least one end of said space, said flange including air bleeding means.

* * * * *